(No Model.) 2 Sheets—Sheet 1.

T. HAWLEY.
METHOD OF JOINING PIECES OF RUBBER CLOTH.

No. 338,068. Patented Mar. 16, 1886.

Witnesses:
E. C. Perkins
E. E. Ruggles

Inventor,
Theodore Hawley
By H. M. Wooster
Atty.

(No Model.) 2 Sheets—Sheet 2.
T. HAWLEY.
METHOD OF JOINING PIECES OF RUBBER CLOTH.
No. 338,068. Patented Mar. 16, 1886.
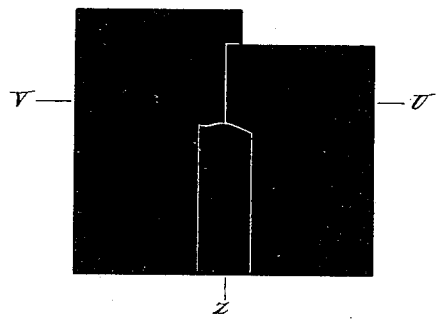
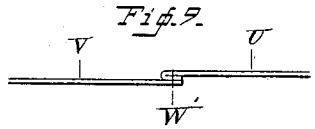
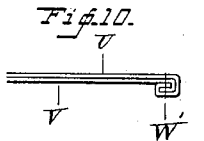
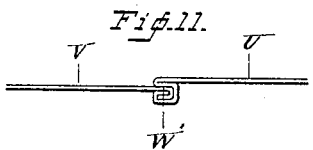
Witnesses,
E. C. Perkins.
E. D. Howell
Inventor,
Theodore Hawley
By A. M. Wooster
atty.

UNITED STATES PATENT OFFICE.

THEODORE HAWLEY, OF FAIRFIELD, CONNECTICUT.

METHOD OF JOINING PIECES OF RUBBER CLOTH.

SPECIFICATION forming part of Letters Patent No. 338,068, dated March 16, 1886.

Application filed December 21, 1885. Serial No. 186,413. (No model.)

*To all whom it may concern:*

Be it known that I, THEODORE HAWLEY, a citizen of the United States, residing at Fairfield, in the county of Fairfield and State of Connecticut, have invented a new and useful Method of Joining Pieces of Rubber Cloth; and I do hereby declare the following to be a full, clear, and exact description of the invention, such as will enable others skilled in the art to which it appertains to make and use the same.

My invention relates more especially to the manufacture of rubber clothing, and has for its object to devise a novel method of joining the several pieces of which rubber garments and other articles are composed by heat and pressure without the use of naphtha and other solvents for softening the edges of the pieces before they are laid together, and without the use of hand-tools to perfect the seams.

It will of course be understood that my invention is not limited to the manufacture of rubber clothing, but relates, broadly, to the joining of pieces of rubber cloth.

The method which is now in common use, and is, in fact, about the only means of uniting pieces of rubber cloth, is substantially as follows: The edge of one piece is covered upon the back with cement as far from the edge as the proposed width of the seam. The edge is then folded over about one-sixteenth of an inch, the cement of course sticking the fold down. The face of the other piece is then softened with naphtha to about the same distance from the edge as the cement is placed on the other piece. The first piece is then laid over the second piece—that is to say, the cemented back of one piece is placed over the softened face of the other piece. The seam is then rolled down hard by a hand-roller, and imitation stitching or any other ornamental appearance is produced by another hand-tool.

My novel method, of which the following description, in connection with the accompanying drawings, is a specification, enables me to produce a neater and stronger seam and to make the seams much more quickly than has heretofore been possible.

It will of course be understood that numerous styles of seams may be produced by my improved method.

In order to make clear the application of my invention, I have illustrated several styles of seams.

Figures 1, 2, 3, and 4 are views illustrating the steps in the formation of one style of seam by my improved method. Figs. 5 and 6 illustrate the formation of a similar seam, the difference being that cement is used at the edge of one piece. Fig. 7 is a plan view illustrating a seam in which the edges of the parts are lapped over without doubling, are heated and pressed together, and then a strip of gum or gummed cloth is laid over the seam and heated and pressed thereon. Fig. 8 is an edge view representing a seam substantially like that shown in Figs. 1 and 4, the difference being that the strip of gum or gummed cloth is laid over the seam, then heated and pressed down. Fig. 9 is an edge view illustrating the same seam strengthened by a line of machine-stitching; and Figs. 10 and 11 are edge views illustrating a seam in which the parts are folded over each other, then stitched, and finally opened out and pressed down.

Similar letters denote the same parts in all the figures.

U represents the upper piece, and W the lower piece, of rubber cloth. In making the seam illustrated in Figs. 1 to 4, inclusive, the pieces are laid upon a heated table, face to face, as shown in Fig. 2, and while in this position are passed between rollers, the lower roller being heated, the upper roller being cold. This is in order that the lower piece and under side of the upper piece only shall be heated, the upper side of the upper piece being kept cold.

Mechanism which I have used in carrying my invention into practice will be found illustrated in my pending application, Serial No. 186,412, filed of even date herewith. The rollers are only allowed to bear upon the piece the width of the seam.

W represents a line of imitation stitching, which is used partially for ornament and partially to assist in uniting the pieces firmly together.

After the pieces have been passed between rollers in the position explained, the upper piece, U, is folded over, as shown in Fig. 3, and both parts are then passed between rollers again, both pieces this time being face upward, the rollers bearing on the seam as before. The second line of stitching is put on in order that the seam may appear more neatly finished, as clearly indicated in Fig. 4.

In Figs. 5 and 6 the seam is made in exactly the same manner, excepting that cement is used at the edge of the upper piece, the under side thereof being shown uppermost. In these figures I have indicated the cemented portion by Y.

In the higher grades of goods no cement will ever be necessary. In the lower grades of goods I have preferably used it to strengthen the seams.

In Fig. 7 the edge of the upper piece is simply laid over the lower piece upon a heated table. After the gum upon the lower piece has become softened by the heated table the pieces are passed through rollers, as before, after which a strip, Z, of gum or gummed cloth, is laid over the seam, heated, and passed between the rollers, as before.

In Fig. 8 the seam is made similarly to that in the first six figures, the only difference being that it is narrower. After the seam has been completed, as already described, it is additionally strengthened by the addition of a strip of gum or gummed cloth, which is then heated and pressed down, as in the form illustrated in Fig. 7.

Fig. 9 shows a similar seam strengthened by a line of machine-stitching, W'.

Figs. 10 and 11 illustrate a seam in which the edges of the parts are folded over each other, heated, and pressed down, then strengthened by a line of machine-stitching, and then opened out, heated, and pressed down again.

Figure 1:
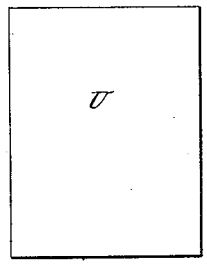
Figure 2:
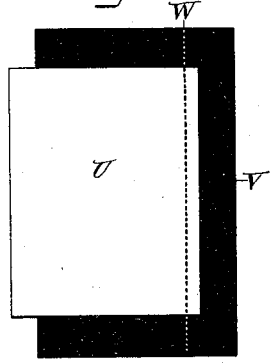
Figure 3:
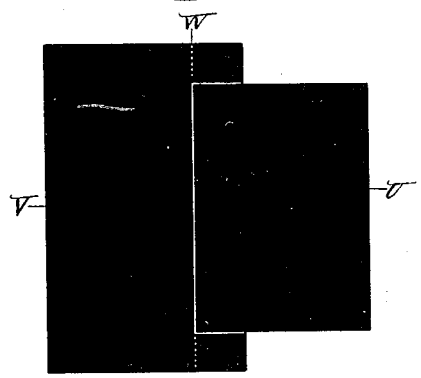
Figure 4:
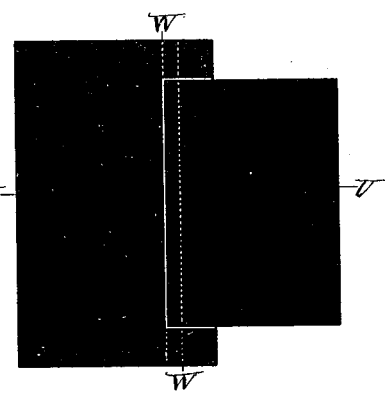
Figure 5:
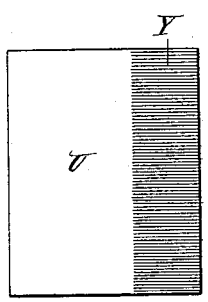
Figure 6:
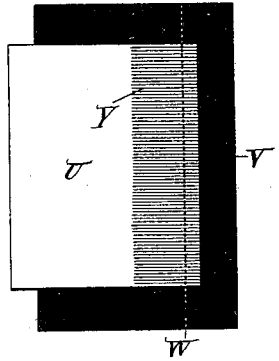

Having thus fully described my improved method, and illustrated various means for carrying it into effect, I claim as my invention—

1. The improvement in the art of joining pieces of rubber cloth, which consists in heating the lower piece, placing the upper one over it, then rolling them together under great pressure, the lower piece being kept heated and the upper piece cold.

2. The improvement in the art of joining pieces of rubber cloth, which consists in placing them face to face, heating the lower piece, whereby the gum is softened, mechanically pressing them together the width of the seam, then turning the upper piece back face upward, and finally mechanically pressing them together again with heat applied to the lower piece only.

3. The method of joining pieces of rubber cloth, which consists in cementing the edge of the upper piece, placing the upper piece over the lower, face to face, heating the lower piece, whereby the gum is softened, mechanically pressing the pieces together, then turning the upper piece over backward, and finally mechanically pressing them together again with heat applied to the lower piece only.

4. The method of joining pieces of rubber cloth, which consists in heating the lower piece, placing the upper one over it, then pressing them together with heat applied to the lower piece only, and finally placing a strip of gum over the seam and pressing it thereon with heat applied from below only.

In testimony whereof I affix my signature in presence of two witnesses.

THEODORE HAWLEY.

Witnesses:
A. M. WOOSTER,
E. C. PERKINS.